INVENTORS:
OTTO J. ALDHART
PETER L. TERRY

BY Miriam H. Leff
ATTORNEY

INVENTORS:
OTTO J. ALDHART
PETER L. TERRY

ATTORNEY

United States Patent Office 3,709,736
Patented Jan. 9, 1973

3,709,736
FUEL CELL SYSTEM COMPRISING NON-CIRCULATING, COUNTER-CURRENT GAS FLOW MEANS
Otto J. Adlhart, Newark, and Peter L. Terry, Madison, N.J., assignors to Engelhard Minerals & Chemicals Corporation, Murray Hill, N.J.
Continuation-in-part of application Ser. No. 859,111, Sept. 18, 1969. This application Aug. 17, 1970, Ser. No. 64,319
Int. Cl. H01m 27/00
U.S. Cl. 136—86 R    10 Claims

ABSTRACT OF THE DISCLOSURE

In an air-breathing fuel cell stack utilizing a stable acid electrolyte system and electrically and thermally conductive plates between the individual cells, the air sweep simultaneously supplies oxidant and maintains the temperature and water balance in the cell. The triple function control by air flow is made possible by virtue of a combination of the particular type of electrolyte and by an improved arrangement of air feed to the cells.

This application is a continuation-in-part of copending application Ser. No. 859,111, filed Sept. 18, 1969.

The invention herein described was made in the course of work under Contract DAAK 02-C-0407 with the United States Department of the Army.

BACKGROUND OF THE INVENTION

This invention relates to an apparatus comprised of a stacked fuel cell assembly and means for controlling the moisture, the temperature distribution, and the fuel and air feeds in the cell. In particular it relates to a reliable compact self-contained fuel cell system which is not limited to but is especially adapted for providing electric power for long term unattended operation such as required for remote areas.

Fuel cells have various attractive advantages which make them potentially useful as a power source for many applications. Among the possible uses is a source of primary power in remote areas where the usual sources of power are unavailable and where service and maintenance of equipment would be limited. Examples in this area are unattended communications repeaters, navigational aids, and weather and oceanographic stations. For such applications the power system must be self-contained and the reliability of the system is of maximum importance.

Among the problems which have been present in fuel cell systems are the control of temperature in the cells and the removal of waste products. Another problem is the ability of the system to continually supply and distribute the reactant feeds across the electrodes. It will be appreciated that each of these problems is highly complex. For example in the case of temperature control it is not only necessary to remove heat generated in the reaction, but also to accomplish this with a minimum temperature gradient across the electrodes. It is important that the temperature distribution over the cell area is as uniform as possible, this will maintain a uniform current density and consequently minimize all degradation. In the case of cells operating with a hydrogen containing fuel and an oxygen containing oxidant the product is water. The precise control of water removal has long been a problem. The difficulty lies in the fact that the rate of water removal has to match precisely the rate of water formation. When the reactant gases are used to remove the water from the cell, uniform distribution of the reactant gases and the temperature over the active cell area becomes particularly difficult. A close control of these factors is required to avoid imbalances with consequent harmful effects on the cell. The control of these critical operational problems becomes most acute when size, weight and complex self-containment constraints are imposed upon the design of the power system.

Various means have been proposed to solve these problems. The suggested methods of thermal control have dependent in part on the type of electrolyte employed. For example, with liquid electrolytes, it has been suggested to circulate the electrolyte through an external cooling system. With an immobile electrolyte, stack cold plates, such as plates thermally connected to a cooling pipe through which coolant flows, or bipolar plates provided with cooling fins which extend into a separate cooling chamber, have been proposed. Generally, the previously suggested means for solving the problems have not been satisfactory mainly in that they add to the complexity while reducing the reliability of the system.

In the aforementioned copending application Ser. No. 859,111, the improved heat removal is achieved by the particular design of the bipolar plates of high thermal conductivity. These plates have cooling fins and they are of dimensions defined by a given formula to give a minimum heat transfer path from the inlet to the outlet of air across the active area of the cell. In this way the temperature differential in the cell is maintained low. It is well known in the art that for successful operation, particularly to maximize the long term performance stability, a uniform current density over the area of each cell, is required. The bipolar plates, therefore, must consist of a highly thermo-conductive material and the horizontal heat transfer path kept short to maintain the temperature throughout the fuel cell as uniform as possible. Whereas such fuel cells have been built and have operated successfully for many 1000's of hours, the cell stacks must by definition be of a rather narrow configuration and, therefore, have practical limitations with respect to power capacity.

In accordance with the present invention a fuel cell system is provided in which the control of temperature, product water, and distribution of sufficient oxygen to and across the cathodes is achieved without the use of an external cooling system, separate coolant fluids, or complex devices. Moreover, the restrictions mentioned above have been, to a large extent, eliminated. The cell plates do not require cooling fins, also thickness and thermal conductivity are no longer as critical. Furthermore, the length of the flow path of the oxidant feed across the cell is only dependent on pressure drop considerations so that the cell stack configuration can be made to suit individual requirements with little, if any, effect on uniform temperature distribution throughout the cell.

In the present invention the oxidant feed flow performs the triple function of removing waste heat and product water and supplying the oxidant to the cells. This is made possible by virtue of the particular type of electrolyte used and by the improved method of heat removal from the cells. This improved heat removal is achieved by a novel arrangement of the oxidant feed to the fuel cell stack, as described below.

SUMMARY OF THE INVENTION

Figure 1:
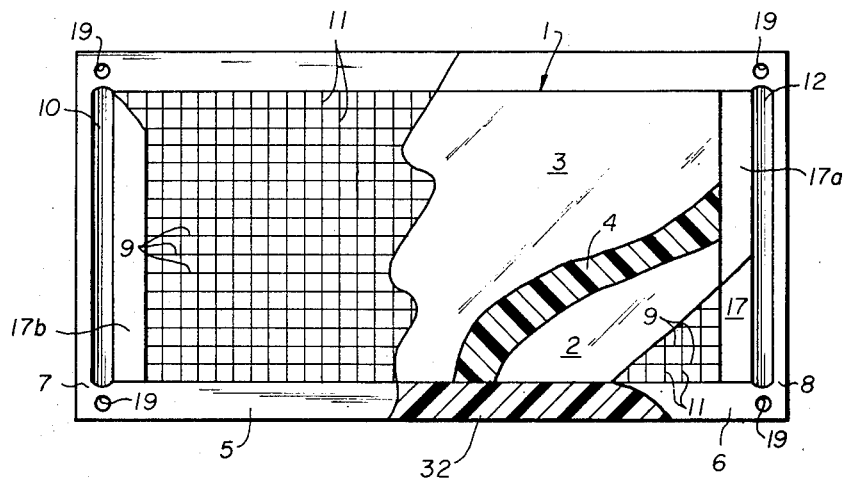
FIG. 1 is a cut-away view showing the construction of a single cell from the fuel entry side, with a bipolar plate on the face of each of the electrodes.

The fuel cell system of the present invention utilizes a cell stack made of a plurality of individual fuel cells, each cell including a fuel electrode, an oxygen electrode, and an immobilized stable liquid electrolyte system. Separating each adjacent cell and in contact with the electrodes is a thermally conductive impervious cell plate reactant distribution, and temperature control. This plate is designed with gas flow channels on the electrode contacting surfaces. Preferably these channels are in the form of grooves. These grooves intercommunicate in the active area of the cell. The gas flow channels extend across the cell plate on the active area of the cell. On the cell plate surface which contacts an oxygen electrode the gas flow channels extend from the edge of the plate at the air inlet side to the opposite side of the plate. The gas flow channels on the surface of the cell plate which contacts a fuel electrode extend from inlet to outlet apertures in the cell plate.

The cells use preferably hydrogen-containing feed as the fuel and air as the oxidant. Water is the product which must be removed. The stack is provided with both fuel and air inlet and outlet means. The inlet and outlet means are preferably disposed for fuel and air flow in a perpendicular relationship to each other.

It will be noted that the fuel cell system is described herein mainly as cells using a hydrogen-containing feed as the fuel and air as the oxygen-containing feed. In accordance with well-known fuel cell systems the fuel may also be a hydrocarbon such as propane or a light naphtha. Ammonia may also be used as the fuel. The feed to the oxidant electrode may be any inert gas, e.g. nitrogen or argon, which carries the required oxidant. The mutliple function, which is described as being performed by the air flow, will then be performed by the feed to the oxidant electrode.

In accordance with one aspect of this invention the air flow is used to supply the oxidant, to regulate the temperature of the fuel cell and to remove waste products from the cell.

In accordance with another aspect of this invention the rate of air flow to the fuel cell is regulated in response to the temperature in the cell.

In accordance with a further aspect of this invention, the air inlet means are manifolded to provide a parallel counter-current air flow arrangement in the cell. To achieve this the air is manifolded to enter alternate cells or groups of cells in the fuel cell stack from opposing sides.

In accordance with another aspect of this invention the adjacent air inlet means to the cell and air outlet means from the cell orient the incoming and outgoing air on the same side of the cell in a perpendicular relationship to each other.

In accordance with still another aspect of this invention, the fuel stack is used in electrical combination with a generator, which generator releases free hydrogen-containing gas from a fuel containing hydrogen in a chemically combined state. For example, ammonia or a hydrocarbon may be used as the source of hydrogen. In a preferred embodiment the hydrogen is produced by catalytic dissociation of anhydrous ammonia and a part of the electrical energy produced by the fuel cell may be supplied to the generator to provide energy to dissociate the fuel. The use of electrical energy to control the reaction in the hydrogen generator adds to the reliability of the system.

DETAILED DESCRIPTION

(A) Immobilized stable liquid electrolyte

A significant feature of the fuel cell stacks of this invention is the use of an immobilized stable liquid electrolyte. As noted above, it is the use of this type of electrolyte which enables the design of a cell in which the air flow alone can be used to perform the triple function of providing the oxidant and removing heat and water from the cell.

The immobilized stable liquide electrolyte system used in a cell of this invention is characterized by chemical and physical stability at the operating conditions of the cell, i.e. in a moderate temperature range fuel cell and in the presence of air. It is further characterized by a low vapor pressure and low volume change when subjected to the operating conditions of the cell. Although the cell is not limited in this respect, it has been found that concentrated phosphoric acid, e.g. 90 to 100% phosphoric acid is particularly suited as an electrolyte for the fuel cell system of this invention. It has been found, for example, that the properties of the concentrated phosphoric acid, with respect to its relationship to the air flow is such that the flow requirements for the removal of heat by far exceed that required for oxidant supply and water balance. Thus, the air flow can be adjusted so that sufficient oxidant is fed to the cell, sufficient product water can be removed from the cell, and sufficient heat can be removed to maintain the cell at optimum operating conditions without disturbing the physical and chemical properties of the electrolyte and stable electrical characteristics are established in the system. An example of an electrolyte member especially suitable with respect to the heat and water balance in the cell is the electrolyte membrane of U.S. Pat. No. 3,453,149.

(B) Cell plates

The air and fuel feeds entering the fuel cell stack are distributed across the electrodes through gas flow channels on the surface of the cell plates. As indicated above, thermally conductive plates separate each adjacent cell in the cell stack and are in contact with the electrodes. The plates are made of thermally conductive materials and have gas flow channels on the electrode contacting surfaces. In selecting a suitable material of construction for the cell plates, the corrosive environment of the cell, the electrical and thermal conductivity of the material, the cost of the material and the cost of fabrication are considerations. Where weight is also a factor, the plate is suitably constructed, for example, of aluminum or magnesium having a protective coating, e.g. gold. Other suitable materials include titanium, niobium, tantalum, alloys thereof, graphite, carbon-containing plastic composites, and the like. Heretofore, graphite was not a preferred material because of thermal considerations. It is a particular advantage of the fuel cell of this invention which uses counter-current air flow that graphite can be used effectively as the material of construction of the cell plates. Graphite compares favorably with suitable metals of construction because of its lower cost and the ease of fabrication of suitable channeled structure, as well as high resistance to the corrosive environments of the cell. The cell plates may have cooling fins, however, when the air distribution is arranged to provide counter-current air flow in the cell, cooling fins are not required.

The cells and cell plates may be arranged in such manner that current from the stack can be withdrawn with the cells connected in parallel or in series or by using a combination of cells connected in parallel and in series. It will be appreciated by those skilled in the art that unipolar or bipolar plates are used depending on the particular electrical arrangement desired. In one embodiment, for example, for parallel connection adjacent cells are separated by using cell plates of a unipolar type, and by alternating cell plates which contact anodes on both surfaces with cell plates which contact cathodes on both surfaces. In an embodiment for series connection, adjacent cells are separated by bipolar plates which contact an anode on one surface and a cathode on the other surface.

For convenience the discussion below will be mainly directed to fuel cell stacks electrically connected in series and using bipolar plates. However, those skilled in the art will recognize that the principles disclosed with respect to this embodiment can be applied to the various combinations of cells using unipolar plates which are connected in series, parallel, or a combination thereof.

(C) Counter-current air flow

By counter-current air flow is meant that the air is manifolded to the individual cells or to subsections in the stack to provide a counter-current air sweep pattern in the cell stack. The counter-current pattern may be arranged to alternate cells or groups of cells. The air enters the cell, preferably at ambient temperature, sweeps across the electrode, providing oxygen and picking up moisture and heat, and exits from the cell at the opposite side of the cell. In a preferred embodiment of this invention, in order to minimize heat exchange between the inlet and outlet air on the same side of the cell, the manifold frequency for air entry is to groups of cell laminates, rather than to alternate cells, and the air entry and exit at each side of the stacks are oriented perpendicular to each other.

The principal advantage of the air flow design of this invention resides in the efficient removal of waste heat from the cell with little temperature gradient. The significance of such efficient heat removal cannot be overemphasized. As stated earlier, temperature uniformity greatly improves the cell life. In fact, it is essential for the design of a fuel cell which is practical in size, weight and cost since temperature uniformity is also imperative for high current density operation.

The counter-current air flow in accordance with this invention, utilizes the vertical as well as horizontal thermal conductivity in the cell stack. Thus, in addition to the horizontal heat flux through the cell plates from the outlet to the inlet for each air stream across the active area of the cells, there now exists a second much shorter path vertically through the cells most pronounced in the vicinity of the area where the cells commence, so that the temperatures of the entering and exiting air streams equalize vertically through the cells and so bring about a relatively uniform heat distribution across the area of the cells. As a result, the desired uniform current density and uniform fuel consumption over the total area of each cell is achieved in the stack. Due to the improved higher heat flux, it was found no cooling fins are required and relatively thick cell plates of moderate thermal conductivity, e.g. graphite, can be employed.

The counter-current air flow of this invention will be more fully understood by reference to the drawings and the examples given below.

Figure 2:
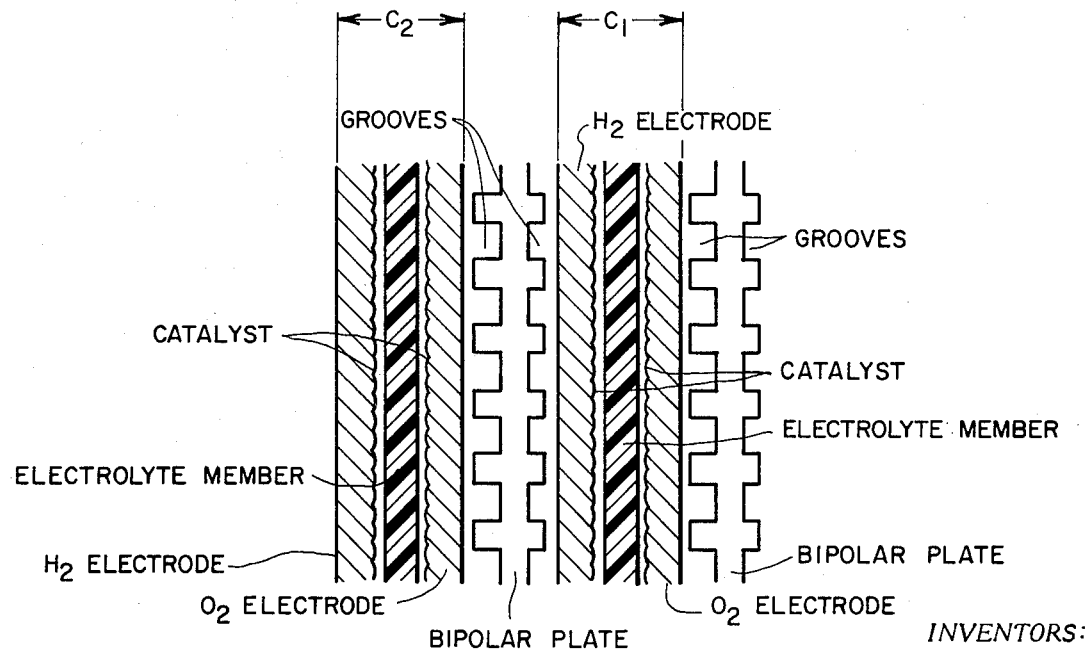
FIG. 2 is an enlarged schematic cross-sectional detail of a cell stack, partly spaced apart.

Referring to FIG. 1, each cell 1 consists of a fuel electrode 2 an oxygen electrode 3, and an electrolyte member 4 which consists of an immobilized electrolyte, e.g. 85 to 100% phosphoric acid, retained in a microporous matrix, for example, polytetrafluoroethylene, as described in U.S. Pat. No. 3,453,149. Useful electrodes for this cell structure are constructed of platinum group metal catalyzed porous polytetrafluoroethylene metallized on the surfaces and throughout the pores with a gold coating. Electrodes of this type are described in U.S. application Ser. No. 685,220 filed on Sept. 27, 1967 and in an article by Dr. O. J. Adlhart in Engelhard Industries Technical Bulletin vol. VIII (1967) at p. 57. Cells using a membrane and electrodes as described above operate at a temperature from about 100 to 200° C., and preferably at about 125° C. FIG. 1 shows the cell elements 2, 3 and 4 which make up the cell 1, also referred to herein as the cell laminate, between bipolar plates 5 and 6. The bipolar plates are impervious, thermally and electrically conductive plates, e.g. of graphite or gold-coated aluminum which separate adjacent cells, and as shown in FIG. 2, each plate lies between a fuel electrode of one cell, e.g. $C_1$, and an oxidant electrode of the adjacent cell, e.g. $C_2$. In the cut-away view of FIG. 1 only the surfaces 7 and 8 of the plates which contact the fuel electrodes are shown. Grooves 9 serve as gas flow passages for the hydrogen-containing fuel, e.g. $H_2$, which enters the cell at oval port 10. Grooves 11, perpendicular to grooves 9, form a crisscross pattern which aids in the distribution of the fuel across the electrodes. Outlet 12 is provided for unused feed gas.

Figure 3:
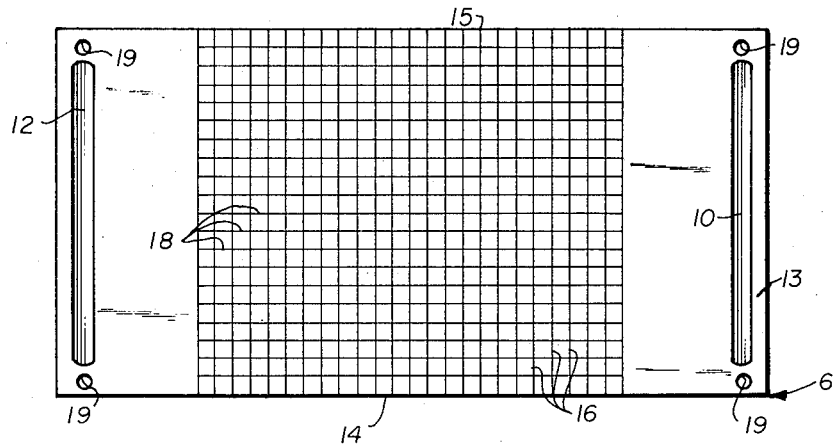
FIG. 3 is a plan view of the side of the bipolar plate which faces on an oxygen electrode.

FIG. 3 shows the crisscross pattern of bipolar plate 6 on surface 13, which contacts an oxygen electrode. As shown in FIG. 3, the grooves 16 extend from the outer edge 14 to the opposite side 15 of the bipolar plate 6. The grooves 18, perpendicular to grooves 16 form a crisscross pattern for oxidant distribution on the oxidant electrode.

Although the gas flow channels are shown as grooves in the embodiments of FIGS. 1, 2, 3, and 4, it will be appreciated that the channels can take other forms, e.g. the plate can be embossed, or screens or expanded metal structures can be placed over the bipolar plate. In fuel cells which use electrically conductive metal screens on the surface of the cell plates, it is not necessary for the cell plates to be electrically conductive. However, in a preferred embodiment the channels for the food distribution are grooves in the cell plates, the cell plates are electrically conductive and the cell plates serve as current collectors as well as for the distribution of the feed across the electrodes and for heat removal from the cell. Also, the crisscross pattern, shown for example in FIG. 1, is only one of a number of configurations suitable for the surfaces of the plate. The purpose of the crisscross pattern is to distribute the reactant feeds across the electrodes. An important feature of the crisscross grooves is that the gas flow passages interconnect for good gas distribution across the active area of the cell. It was noted above that in the fuel cell system of this invention graphite can be used as the material of construction. The graphite can be molded in the desired configuration.

Reference to FIG. 2 shows the arrangement of the cell members and bipolar plates in a stack. It will be noted that the grooves of the bipolar plate on the side facing the oxidant electrode are deeper than the grooves on the side facing the fuel electrode. For example, in a coated aluminum plate of about 1/8" thickness, the grooves on the oxidant electrode surface are 0.03" wide by 0.05" deep on 0.05" centers. On the fuel surface, the grooves are 0.03" wide by 0.03" deep on 0.05" centers. The purpose of the deeper grooves on the oxidant surface of the plate is to minimize the pressure drop on the oxygen side without sacrificing the effective thermal conductivity of the plate. This air flow design is especially advantageous in that it reduces the back pressure even at high flow rates and back pressure will be about 0.1" to 2.0" of $H_2O$ depending on current density and cell size.

A fuel stack of the present invention uses a plurality of the individual cells as shown in FIGS. 1 and 2 bolted together externally with end plates (not shown) and aligned by guides provided, e.g. in holes 19 of plates 5 and 6. Thin narrow metal shims 17, 17a and 17b are provided between the electrodes and the plates to prevent the cell laminate from penetrating the grooves. Gasket 32, which encompasses the cell laminate, serves as a seal between adjacent plates 5 and 6 and the perimeter of the cell laminate. FIGS. 1 and 3 show oval openings 10 and 12 in bipolar plates 5 and 6. In the stack these oval openings serve as fuel manifolds. It is, of course, possible to have several smaller apertures for the fuel inlet and outlet rather than the oval openings shown in the drawings. When stacking the bipolar plates these openings form chambers on either side of the stack. It has been found advantageous to direct the fuel flow to the stack in such a way that groups of cells are in series. This permits maximum utilization of the hydrogen in dilute hydrogen streams.

Air and fuel flow arrangements, in accordance with this invention, are schown schematically in FIGS. 4, 5, 6a, 7a and 7b. The schematic detail of a cell stack 20 shown in FIG. 4 comprises a cover plate 21 and a bipolar plate 22 and a cell laminate consisting of an anode 25, a cathods 26 and an electrolyte member 27. The cover plate 21 has air flow passages 23. The bipolar plate 22 has air flow passages 23 and fuel flow passages 24. As noted above, the electrolyte member 27 is comprised of a stable liquid electrolyte system, e.g. of immobilized phosphoric acid. The cell element of this embodiment functions as follows: Ambient air enters each cell element through grooves 23, flows through the cell providing oxygen and picking up heat and moisture and leaves the cell on the opposite side. It will be further observed in FIG. 4 that the fuel flow is perpendicular to the air flow. While this is not an essential feature of the cell, it is convenient configuration for simple manifolding of the feeds to the cell. The air enters the cell laminate on the edge of the bipolar plates and in a direction concurrent with the path of the grooves 23 leaves the cell at an elevated temperature on the opposite side. It will be noted that in this embodiment counter-current air flow is arranged for adjacent cells. The fuel, e.g. $H_2$, enters the cell through grooves 24. As indicated above, for steady operation of the stacked cells, regardless of ambient temperature, air humidity and load conditions, one only has to assure that the temperature remains constant. This can be accomplished readily by varying the flow of cold air admitted to the stack. Brushless type D.C. motors which have long life and which can be controlled by a thermocouple quite easily, e.g. Siemens 1 AD Series, available from Siemens America Incorporated, New York, N.Y., have been developed recently, and such motors are ideally suited for the control of the air flow to the cells. Seals 31 in FIG. 4 prevent leakage of the reactants. The seal may be in the form of a gasket, e.g. of polytetrafluoroethylene which completely surrounds and encases the cell laminate consisting of the matrix and two electrodes. Thin shims or spacers (not shown) well known in the art are used to keep the seals and the cell laminate from blocking the grooves of the bipolar plate.

Figure 5:
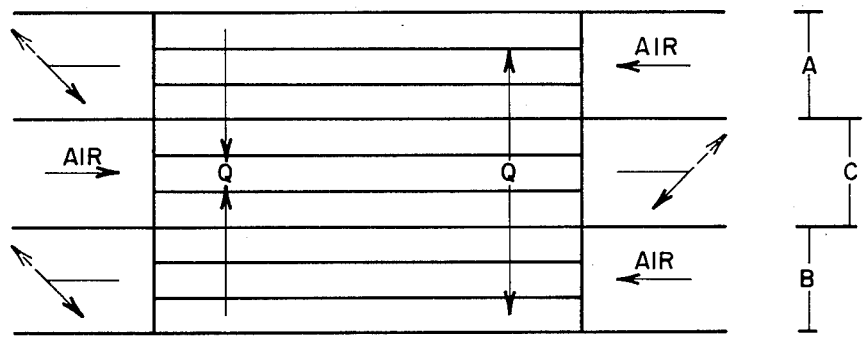
FIG. 5 is a schematic sketch showing the counter-current air flow concept of this invention and the vertical heat flux with respect to a nine cell stack arranged for air manifolding to three, three-cell groupings.

As indicated above, it is the counter-current manifolding of the air flow in the cell which permits the efficient heat removal. FIG. 5, a schematic sketch, illustrates an air flow pattern in accordance with this invention in a nine cell stack with three three-cell groupings. The cell groups in the sketch are designated as cell groups A, B, and C. In groups A and C air flow across the cell laminates is in the same direction; in group B the air flow is essentially parallel and counter-current to the other two cell groups. The vertical heat flux is represented by the arrows designated as Q. The air flows at the inlet and outlet on the same side of the cell are oriented perpendicular to each other.

Figure 6A:
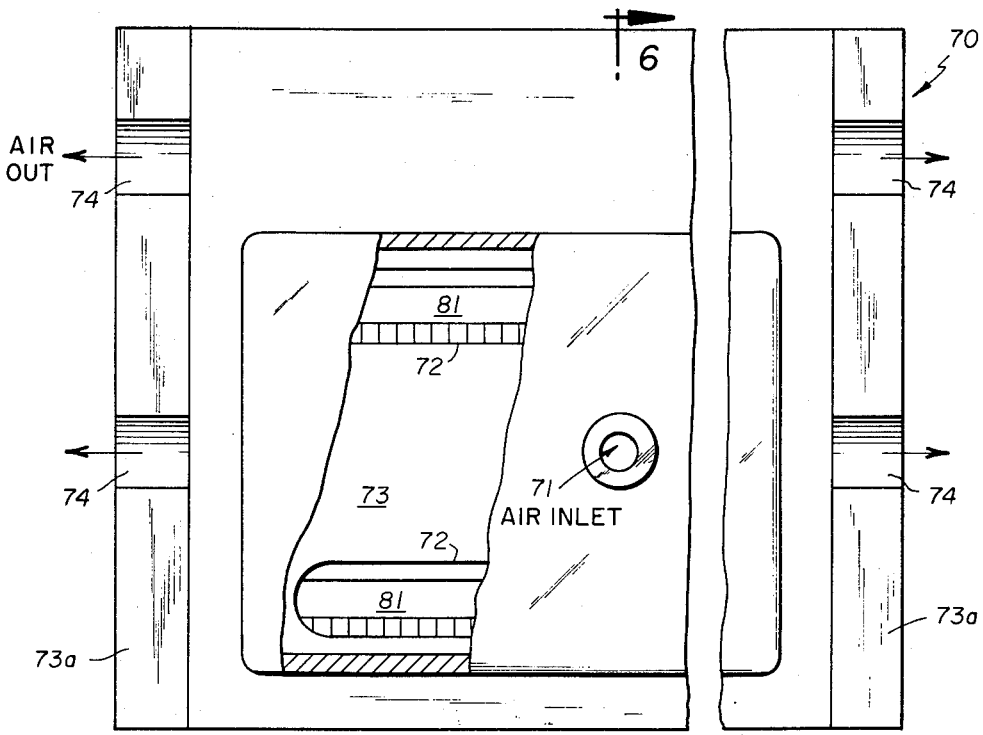
FIGS. 6a and 6b are schematic drawings of a side view and elevational view of an eight cell stack, both partially cut away, showing one method of manifolding the air flow for counter-current air sweep in the cells in accordance with the present invention.

Two methods of manifolding the air flow are shown schematically in FIGS. 6a and b and 7a and b. In both sets of figures the air flows of every two cells are combined. They are separated from the air flow of the adjacent two-cell groups by long spacers between each second set of bipolar plates. The alternate bipolar plates are separated by short spacers. The long spacers serve to form manifold chambers alternately for incoming and outgoing air. In this way, direct heat transfer between incoming and outgoing air is kept at a minimum. (Fuel distribution is not shown in these drawings.)

Figure 6B:
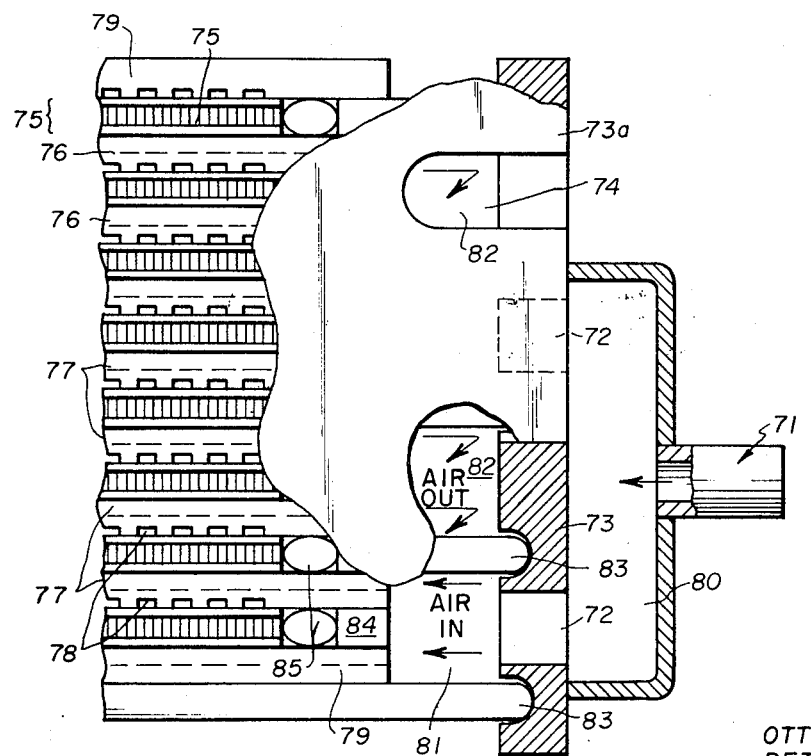

FIG. 6a shows a side view of fuel cell stack 70 with air inlet 71 and inlet ports 72 in inlet plate 73 for air distribution to the cells. The cold air admitted to the cells from the opposite side (not shown) of the stack is exhausted as hot air through air outlet ports 74 in outlet plates 73a. FIG. 6b is a schematic section taken along lines 6—6 of FIG. 6a, which shows a sectional elevational view, partly cut away, of fuel cell stack 70. Cell stack 70 is composed of cell laminates 75 separated by bipolar plates 76 having grooves 77 (shown as broken lines) and 78 for air and fuel flow, respectively, into and out of the active area of the individual cells. The members of the stacks are held together between grooved end plates 79 by bolting (not shown). Air, preferably at ambient temperature, enters from inlets on opposite sides of the cell. In the view shown in FIG. 6b, air enters the cell stack 70 through chamber 80 and ports 72 in inlet plate 73. Alternate air manifold chambers 81 and 82 are formed by long spacers 83 for air inlet and air outlet, respectively, on the same side of the stack.

Gaskets 85 as well as short spacers 84 and long spacers 83 serve to seal the fuel flow paths against air entry. The spacers are made of polypropylene and the gas distributor plates are made of an impervious refractory insulating material, such as NEMA grade G-7 stock which is a reinforced silicone and glass material supplied by National Electrical Manufacturing Association, in order to minimize heat transfer between the incoming and outgoing air.

Figure 7A:
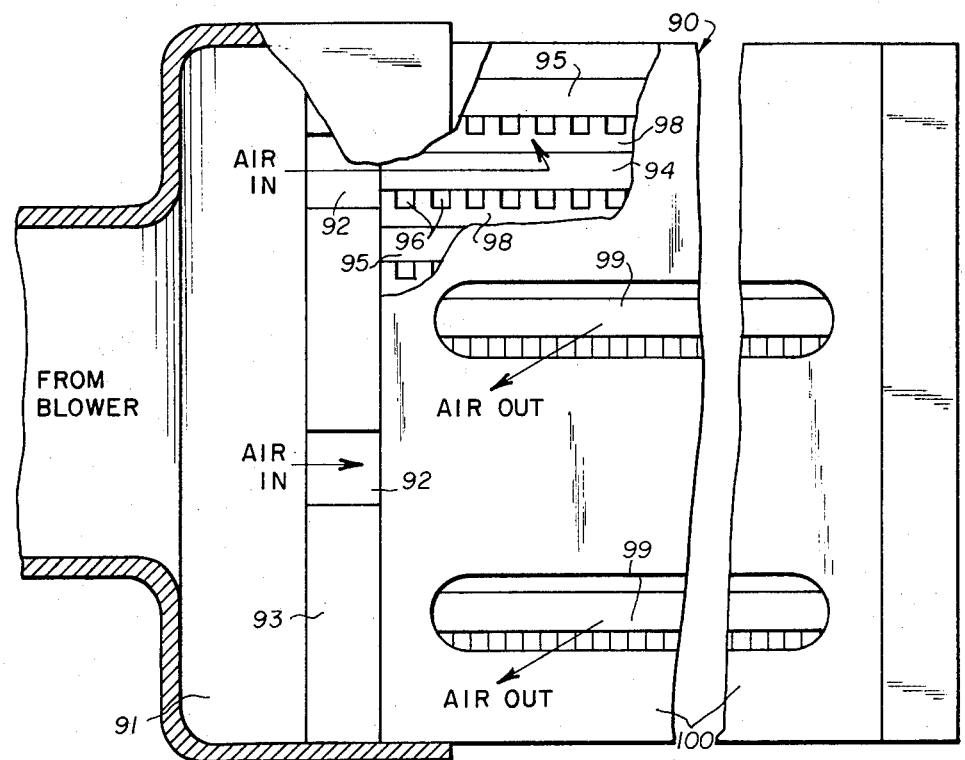
FIGS. 7a and 7b are schematic drawings of a side view and end view of a fuel cell stack, both partially cut away, showing another method of manifolding the air flow for counter-current flow in accordance with this invention.
Figure 7B:
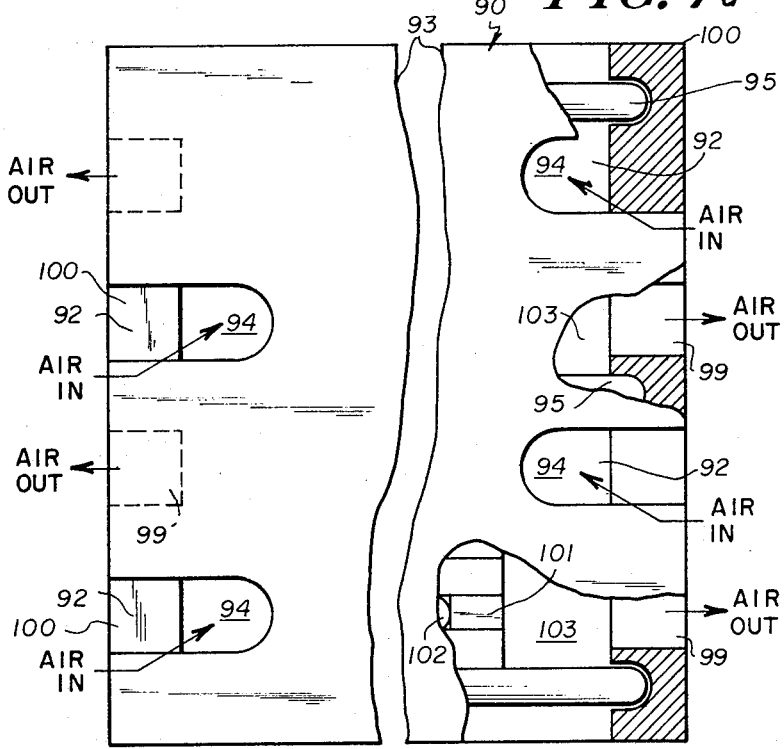

FIGS. 7a and 7b represent another embodiment of a fuel cell stack with counter-current air flow emanating from a blower (not shown).

FIG. 7a is a schematic drawing, partly cut away, showing a side elevational view with blower duct. Air enters two sides (only one side shown in this view) of cell stack 90 through blower duct 91. The air passes through ports 92 in an inlet plate 93 into air inlet manifold chambers 94 formed by long spacers 95. The air passes into cells through grooves 96 in bipolar plates 98. Air which has entered the cell stack from the opposite side (not shown) passes out as hot air from ports 99 in outlet plate 100.

FIG. 7b is a schematic drawing, partly cut away, of the end view with blower duct removed. The air can be seen entering the two sides of the cell stack 90 through ports 92 into the air inlet manifold chambers 94 and leaving the two sides from air outlet manifolds 103 through ports 99 in outlet plates 100. Long spacers 95 on each side separate air inlet manifolds 94 and air outlet manifolds 103 which are arranged in an alternating manner so that a counter-current flow is achieved between any two adjacent air streams. The air passing out of the cell, is, of course, partially depleted in oxygen and has picked up moisture as well as heat from the reaction in the cells. The gaskets 102 as well as short spacers 101 and long spacers 95 serve to seal the fuel flow paths against air entry.

EXAMPLE 1

To test the heat removal efficiency of the counter-current air flow design of this invention, an eight cell stack was constructed similar in design to the cell of FIGS. 6a and 6b. The cell laminates composed of air and fuel electrodes and a phosphoric acid matrix type electrolyte member, are of the type set forth in the aforementioned article by Dr. Adlhart. The electrodes are constructed of porous polytetrafluoroethylene metallized with gold and activated by bonding a thin layer of platinum black, as catalyst, to one surface of the metallized sheet. In the stack, the catalyzed surface of the electrode is positioned adjacent to the electrolyte member. The total thickness of the cell laminate is about 1 mm.

Between each adjacent cell laminate is a graphite bipolar plate of 3/16" thickness, made of Purebone L56 carbon (supplied by Pure Carbon Co., St. Mary's Pa.) impregnated with Teflon. The purpose of impregnating the plates is to reduce their porosity and thus minimize diffusion of hydrogen into the cathode chamber. Each carbon plate has fuel manifold holes spaced apart on sides of the plate for fuel entry perpendicular to air entry. The bipolar plates are designed with grooves, molded in the plate, for fuel and air flow across the electrodes.

Gasket material of peroxide cured high temperature ethylene-polyethylene polymer encases the cell laminate and serves as a seal between the adjacent bipolar plates. Spacers of polypropylene, which are 11" x .030", referred to as long and short spacers in FIGS. 6b also serve as a sealant against the entry of air to the fuel electrodes. Thin narrow shims, 0.005" thick, of gold plated brass are provided between the electrodes and bipolar plates to prevent the cell laminate from penetrating into the grooves. The stack is clamped between a plate made of 1" thick aluminum jig plate and the clamping force is provided by 3/8" bolts.

The fuel, viz pure $H_2$ is fed to the fuel manifold at the rates of approximately 6 and 9 grams per hour.

As indicated above, the air flow is manifolded in accordance with the design shown schematically in FIGS. 6a and 6b.
sure drop at various operating current densities, viz 20 amperes (a), which is equivalent to about 100 amperes per square foot (a.s.f.). After being operated for roughly 300 hours, the cell was analyzed thermally and for pressure drop at various operating current densities, viz 20 A. (about 100 a.s.f.), 30 A. (about 150 a.s.f.) and 42 A. (about 210 a.s.f.).

The pressure drop was measured at inlet to the air cavity of the bipolar plates and at the outlet slot from the air manifold. The data are given in Table I.

TABLE I

| Stack current | Pressure drop across outlet slot | Pressure drop across plate |
| --- | --- | --- |
| 20A | 0.05" $H_2O$ | 0.35" $H_2O$ |
| 42A | 0.07" $H_2O$ | 0.90" $H_2O$ |

Figure 4:
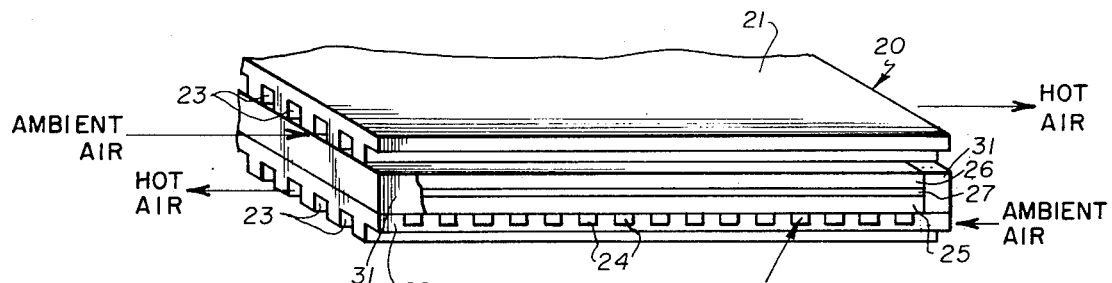
FIG. 4 is a schematic isometric detail, partially cut away, showing the flow passages for entry of the air and fuel, and the counter-current air flow concept of this invention. In this preferred embodiment the fuel flow is oriented perpendicular to the air flow.

This pressure drop is consistent with our design and demonstrates that the air flow and motor, previously described in connection with FIG. 4 can be used in this system.

To determine the efficiency of the heat removal, the temperature of the air at the inlet and the outlet manifold and the temperature gradient across the plate in the third cell were determined with the cell operating at various current loads. The thermal data are summarized in Table II.

At 20 A., the temperature gradient over the actual operating area was less than 5° C. At 30 A., the gradient was approximately 7° C.

TABLE II

Thermal Analysis of Carbon Stack

Package size: 3¾ × 8
Plate thickness: 3/16
Manifold frequency: 2 plates
Number of cells: 8

| Stack amps | Volts | Required air flow, c.f.m.* | Max. temp., °C. | Inlet manifold, °C. | Outlet manifold, °C. |
| --- | --- | --- | --- | --- | --- |
| 20 | 5.9 | 1.6 | 128 | 63–70 | 98–105 |
| 30 | 5.5 | 4.2 | 128 | | |
| 42 | 5.1 | 7.3 | 136 | 60–65 | 93–115 |

Temperature Distribution over 3rd Cell

| | Distance from plate edge (inches) | | | | | |
| --- | --- | --- | --- | --- | --- | --- |
| | 0 | 1 | 2 | 3 | 4 | 5 |
| 20A, °C | 121 | 123 | 126 | 126 | 124 | 121 |
| 30A, °C | 121 | 124 | 126 | 128 | | 121 |

*C.f.m. = Cubic feet per minute.

EXAMPLE 2

A fuel cell stack designed to operate at 20 A. with 100 ma./cm.$^2$ or approximately 95 a.s.f. was constructed of 17 cell laminates, each having an active area of 200 cm.$^2$. The cell laminates are of the type set forth in Example 1.

Between each adjacent cell laminate is a bipolar plate constructed of 1/8" thick gold coated 6061 aluminum alloy machined with 0.030'" wide grooves on 0.050" centers in the direction of reactant flow and 0.130" centers perpendicular to the direction of reactant flow. The grooves are 0.050" deep on the air flow surface of the plate and 0.030" deep on the fuel flow surface. The plate is approximately 11½" x 7¼", with 3¾" length on the active area of the cell from the inlet to the outlet of air, and 8" length on the active area of the cell from the inlet to outlet of fuel, and has a heat exchange fin 8" wide projecting 2" beyond the forward edge of the cell laminate. Each plate has fuel manifold holes spaced apart at a closest distance of 10¼" on opposite sides of the plate for fuel entry perpendicular to the air entry to the plate. As indicated above, it is convenient and preferred to have the air flow and fuel flow oriented in perpendicular relationship to each other and it will be noted that in this cell and fuel flow path defined on the bipolar plate between the inlet and outlet apertures is longer than the air flow path defined on opposite surface of the plate between the air inlet and outlet in the active area of the cell. The cell laminates and the plates were assembled in a similar manner to the description of Example 1.

Air at ambient temperature was fed on one side of the cell only to the fins of the bipolar plates. The air exited from the cell at the opposite side of the plates. Thus a conventional co-current air flow pattern was provided in the stack. The efficiency of heat removal was determined in a manner similar to that described in Example 1.

While delivering 20 amps at 12 volts, the maximum operating temperature was measured as 133° C. with a differential temperature of 11° C. at an air flow of 1.5 cubic feet per minute (c.f.m.). When the power demand was increased to 30 amps, the air flow had to be increased to 3 c.f.m., even so, the operating temperature rose to approximately 156° C. and the temperature differential to 29° C. Operating at this power level, and the resulting temperature gradient, the cell stack can only have a limited life expectancy.

EXAMPLE 3

A fuel cell stack with bipolar plates of the same material and configuration shown in Example 2 was used. Instead of all air entering over the fins of the bipolar plates from one side only and exiting on the opposite side, the direction of the air flow was reversed for each successive group of three laminate cells. The air passed through each group of cells in an alternating countercurrent direction in accordance with the mode of this invention.

For the reversal of the air flow after every three cells, the bipolar plates were positioned in such a manner that the fins of the first three plates faced in one direction while the fins of the next three plates pointed the opposite way. The fins of the following three plates again were positioned in the same direction as the first three fins.

It was found on operating the fuel cell with the counter-current air flows that a very uniform temperature distribution could be achieved over the areas of the individual cells. Temperature distribution measurements on a nine cell fuel cell stack producing 30 amperes at 6.07 volts with a total counter-current air flow of 2.5 c.f.m., in accordance with this invention, and operating at a temperature of approximately 131–132° C. max. showed that the temperature differential is maintained between 4 to 5° C. in the two centermost cells.

In a negative pressure run with the same fuel cell, that is instead of having the air enter at the air inlet, a suction pump was attached to the inlet manifold and so the air flowing through the cells was completely reversed, all inlets became outlets and vice-versa. In this way, all fins of the bipolar plates were located on—what now became—the outlet side of the bipolar plates and so were made completely ineffective as cell cooling means, having the same temperature as the exiting air during operation.

It was found that even though the cooling fins were inoperative with the reverse flow of the air during the suction run, the temperature differential across the cells tested measured only 4–6° C. max. By raising the 31° C. incoming air flow to 4.9 c.f.m., the maximum operating temperature was less than 139° C. while delivering 30 amperes at 6 volts.

EXAMPLE 4

A 16 cell fuel cell stack was built with finless bipolar plates. Essentially the same materials as employed in the fabrication of the fuel cell of Example 2, however, the size was increased so that the active area per cell was 8.5" x 8.5" or approximately 466 cm.$^2$ as against 200 cm.$^2$ of the cell of Example 2, and the heat transfer path for the air flow was increased from 3.75" to 8.5". The cell was operated with pure $H_2$, fed at the rate of 39 grams per hour. The air feed was manifolded for counter-current air feed to every two cells. Temperature measurements were made to determine the efficiency of heat removal in the stack. Results of the measurements are shown in FIGS. 8 and 9.

Figure 8:
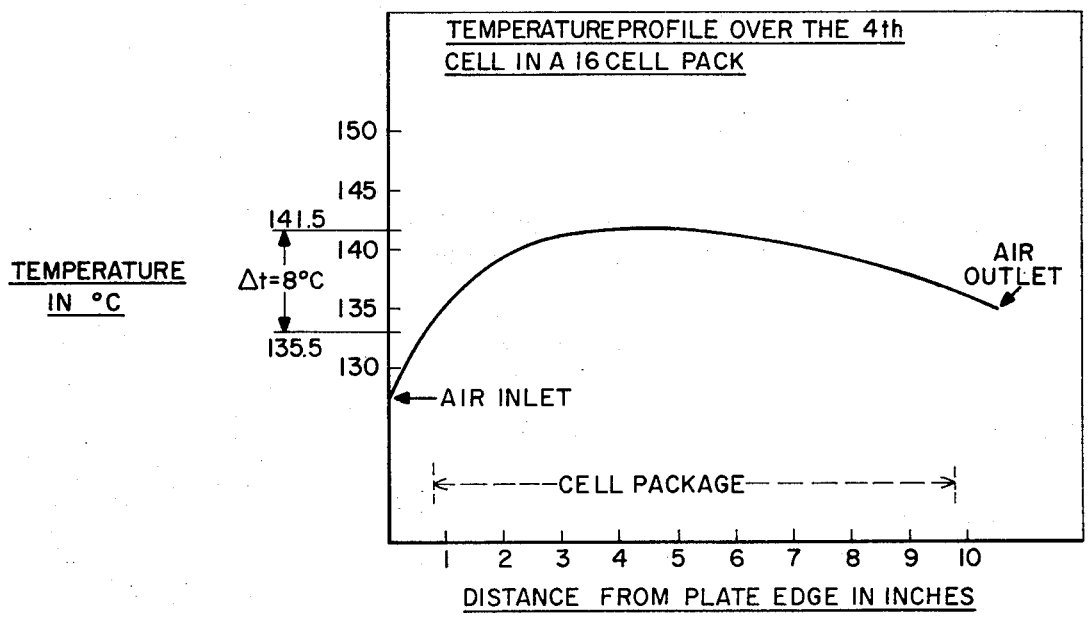
FIGS. 8 and 9 are graphs showing the temperature profile in the cells of a 16 cell stack designed with counter-current air flow in accordance with this invention, as explained in greater detail in an example below.

FIG. 8 is a graph of the temperature profile across the fourth cell in the stack from the air inlet to the air outlet. The cell package refers to the active area of the cell. The graph shows that the maximum operating temperature measured was approximately 142° C. The maximum temperature differential between the air inlet and the center of the cell was 8° C.

Figure 9:
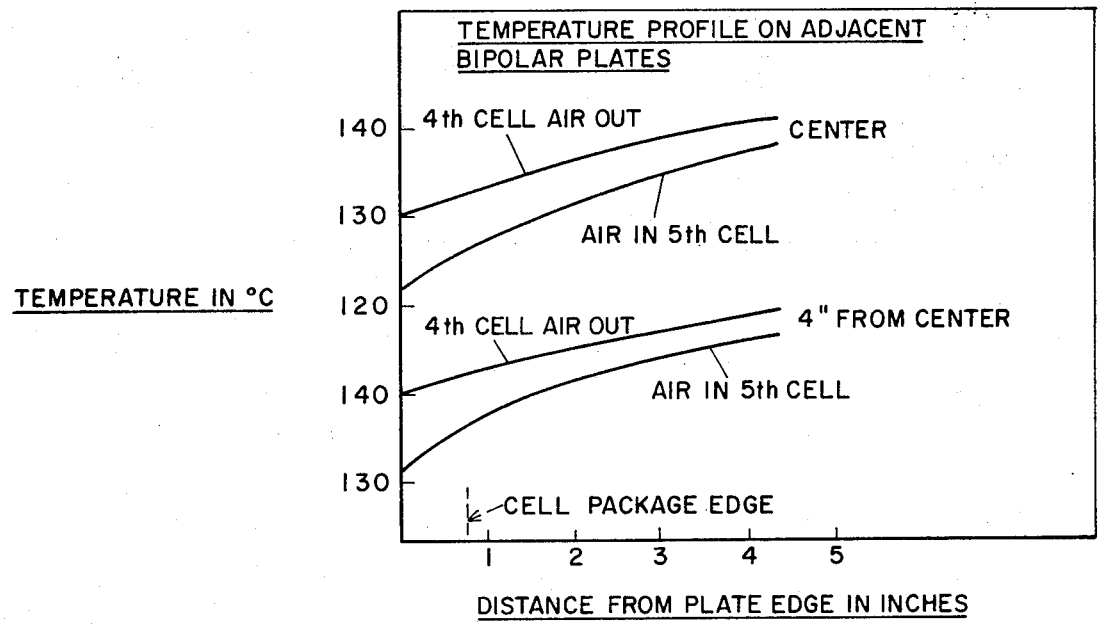

FIG. 9 compares the temperature of two adjacent counter-current air streams across the fourth and fifth cells. The measurements were made across the center of the cell in the plane of the air flow and 4" from the center. Both sets of measurements are shown in the figure.

The results demonstrate that the counter-current air flow, which permits vertical heat transfer through the cells, tends to equalize the temperature distribution during operation of the cell.

Comparing the capacity of the fuel cell of this example, with that of Example 2, the cell of this example was operated at 65 A. and approximately 130 a.s.f., and the fuel cell of Example 2 was designed for operating at 20 a. with 100 ma./cm.$^2$ or approximately 95 a.s.f. With co-current air flow, the cell of Example 2 could not be operated with sufficiently good heat removal at a power level of 30 a., whereas the present cell operated at 65 a. with uniform temperature distribution and good heat removal. This comparison shows that in the cell of the present design the uniform temperature distribution over the area of the individual cells is less dependent on the length of the heat transfer paths in the direction of air flow.

In the cell of the present invention, under most circumstances the practical limits for the cell dimensions will be governed by pressure drop considerations for the oxidant stream rather than the thermal requirements, previously so critical.

What is claimed is:

1. A fuel cell system comprising:
 (a) a plurality of individual fuel cell laminates stacked in substantially parallel relationship to each other, each cell including a catalytic fuel electrode to which a fuel is fed, a catalytic oxygen electrode to which an oxygen containing gas is fed, and an electrolyte member therebetween comprised of an immobilized stable liquid acid said cell having an active area defined therein;
 (b) thermally conductive impervious cell plates separating adjacent cells in said stack each of said plates having surfaces on opposite faces thereof in contact with electrodes of the cells in the stack, the oxygen electrodes being in contact with the oxygen contacting surfaces of said plates and the fuel electrodes being in contact with the fuel-contacting surfaces of said plates;
 (c) means for supplying oxygen to the electrodes on the oxygen contacting surfaces of the cell plates, said means comprising a plurality of parallel gas flow channels on the oxygen electrode contacting surfaces which extend from one edge of said surface of the cell plate to the edge on the opposite side of the surface;
 (d) means for supplying fuel to the electrodes on the fuel contacting surface of said cell plates said means comprising fuel inlet manifold apertures spaced apart in said cell plate and a plurality of gas flow channels on said fuel electrode contacting surface, said channels extending from the inlet to the outlet manifold apertures;
 (e) a plurality of manifolded oxidant inlet means comprising separate counter-current inlets for distributing the oxygen-containing gas to the channels on the surface of each of said cell plates which contact an oxygen electrode, and fuel inlet means for distributing fuel to the fuel inlet aperture in each of said cell plates which contact a fuel electrode; and
 (f) means to regulate the flow of oxygen-containing gas to the oxidant inlet means; wherein the said plurality of manifolded oxidant inlet means communicates separately with opposite sides of the oxidant flow channels of adjacent cell laminates, whereby a parallel; non-circulating counter-current oxidant flow pattern is effected in the stack.

2. A fuel cell system of claim 1 wherein said thermally conductive plates are electrically conductive bipolar plates, said plates having one surface which contacts an oxygen electrode and an opposite face which contacts a fuel electrode.

3. A fuel cell system of claim 1 wherein said thermally conductive plates are electrically conductive unipolar plates, each of said plates having opposite surfaces thereof contacting electrodes of the same polarity, at least one of said plates contacting fuel electrodes on its opposite surfaces and at least another one of said plates contacting oxygen electrodes on its opposite surfaces.

4. A fuel cell system of claim 1 wherein the electrolytic member is concentrated phosphoric acid immobilized in a microporous matrix.

5. A fuel cell system of claim 1 wherein the oxygen containing gas flow regulating means is a temperature activated device.

6. A fuel cell system of claim 1 wherein the adjacent cell laminates are in cell groupings containing at least two cells.

7. The fuel cell system of claim 1 wherein the adjacent oxidant inlet means to the cell and oxidant outlet means from the cell orient the incoming and outgoing oxidant in a perpendicular relationship to each other.

8. The fuel cell system of claim 1 wherein the impervious thermally conductive cell plates are made of graphite.

9. A fuel cell of claim 1 wherein the oxygen-containing gas is air.

10. A fuel cell of claim 1 wherein the fuel is a hydrogen-containing gas.

References Cited

UNITED STATES PATENTS

| | | | |
|---|---|---|---|
| 409,365 | 8/1889 | Mond et al. | 136—86 R |
| 3,146,131 | 8/1964 | Linden et al. | 136—86 R |
| 3,394,032 | 7/1968 | Danner | 136—86 R |
| 3,436,272 | 4/1969 | Gelting | 136—86 |

WINSTON A. DOUGLAS, Primary Examiner

H. A. FEELEY, Assistant Examiner